United States Patent
Beckhusen

(10) Patent No.: US 9,945,081 B1
(45) Date of Patent: Apr. 17, 2018

(54) AUTOMATIC SHUT-OFF FOR A VIBRATORY PLATE COMPACTOR

(71) Applicant: Caterpillar Inc., Peoria, IL (US)

(72) Inventor: Jordan Beckhusen, Robinson, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/298,096

(22) Filed: Oct. 19, 2016

(51) Int. Cl.
| | |
|---|---|
| *E01C 19/38* | (2006.01) |
| *E02D 3/046* | (2006.01) |
| *H02K 7/14* | (2006.01) |
| *B06B 1/16* | (2006.01) |

(52) U.S. Cl.
CPC ............... *E01C 19/38* (2013.01); *B06B 1/16* (2013.01); *E02D 3/046* (2013.01); *H02K 7/14* (2013.01)

(58) Field of Classification Search
CPC .......... E01C 19/38; E02D 3/046; H03K 7/14; B06B 1/16
USPC ........................................ 404/72, 113, 133.2
See application file for complete search history.

(56) References Cited

U.S. PATENT DOCUMENTS

| | | | | |
|---|---|---|---|---|
| 3,775,019 | A | * 11/1973 | Konig | ............. E01C 19/288 |
| | | | | 404/133.1 |
| 4,043,694 | A | 8/1977 | Mullen | |
| 4,278,368 | A | * 7/1981 | Livesay | ............ E02D 3/032 |
| | | | | 172/175 |
| 7,908,084 | B2 | 3/2011 | Anderegg et al. | |
| 8,057,124 | B2 | 11/2011 | Stenzel et al. | |
| 2006/0193693 | A1 * | 8/2006 | Congdon | ............ E01C 19/38 |
| | | | | 404/133.05 |

FOREIGN PATENT DOCUMENTS

| | | |
|---|---|---|
| DE | 102008010461 A1 | 8/2009 |
| DE | 202010017338 U1 | 1/2012 |
| EP | 2258902 A2 | 12/2010 |

* cited by examiner

*Primary Examiner* — Raymond W Addie
(74) *Attorney, Agent, or Firm* — Law Office of Kurt J. Fugman LLC

(57) ABSTRACT

A method for shutting off the vibration mechanism of a vibratory plate compactor assembly comprises sensing the force exerted on the vibrating plate compactor assembly, comparing the exerted force with a predetermined threshold force, and turning off the vibration mechanism if the threshold force is not met or exceeded.

20 Claims, 8 Drawing Sheets

US 9,945,081 B1

AUTOMATIC SHUT-OFF FOR A VIBRATORY PLATE COMPACTOR

TECHNICAL FIELD

The present disclosure relates to vibratory plate compactors. More particularly, the present disclosure is related to a vibratory plate compactor that is operatively associated with an automatic shut-off device that stops the motion of the plate if contact is sufficient contact is not maintained between the plate and a work surface.

BACKGROUND

Vibratory compactors are routinely used in the construction industry and the like to compact soil or other work surfaces. These are often attached to mobile machines that include a cab that houses an operator that controls the operation of the vibratory compactor. These compactors often include an eccentric device that causes a plate to move up and down in a rapid or vibratory manner to effectuate the flattening of the work surface. The operator typically controls when the vibration begins and stops manually via controls located in the cab.

It has been determined that that if downward force is not applied to the vibratory plate, then the spinning of the eccentric mechanism may cause premature wear to occur on the vibration isolators. Consequently, it is important for the operator to turn the eccentric mechanism off when the vibratory compactor is not being used, that is to say, when the plate is not subjected to any downward or upward force as happens when the plate is squeezed between the machine interface and the work surface. Occasionally, the operator fails to turn off the eccentric mechanism when finished using the vibratory compactor or starts the vibration prematurely, before sufficient force has been applied to the plate.

SUMMARY OF THE DISCLOSURE

A vibratory plate compactor assembly may be provided, comprising an upper portion, a lower portion that is movably attached to the upper portion and that includes a compacting plate, a vibration mechanism operatively associated with the lower portion for vibrating the lower portion, a position sensor disposed between the upper portion and the lower portion that is configured to sense if a predetermined position has been reached or a predetermined force is exerted on the lower portion, and a controller that is in communication or operative association with the position sensor and the vibration mechanism, wherein the controller is configured to shut off the vibration mechanism automatically if the position sensor does not send a signal indicating to the controller that the predetermined force has been reached.

A machine that is compatible with a vibratory plate compactor assembly may be provided. The machine may comprise a controller, a motor, an undercarriage that is driven by the motor, and a vibratory plate compactor assembly. The assembly may include an upper portion, a lower portion that is movably attached to the upper portion and that includes a compacting plate, a vibration mechanism operatively associated with the lower portion for vibrating the lower portion, and means for sensing the force exerted on the lower portion of the assembly. The controller may be in communication or operative association with the vibration mechanism and the force sensing means, and the controller may be configured to shut off the vibration mechanism if the predetermined force is not exerted on the lower portion of the assembly.

A method for shutting off the vibration mechanism of a vibratory plate compactor assembly may be provided. The method may comprise sensing the force exerted on the vibratory plate compactor assembly, comparing the exerted force with a predetermined threshold force, and turning off the vibration mechanism if the threshold force is not met or exceeded. The method may also comprise sensing the position of the vibratory plate and comparing the instantaneous position with a threshold position, and turning off the vibration mechanism if the threshold position is not met or exceeded

DETAILED DESCRIPTION

Figure 1:
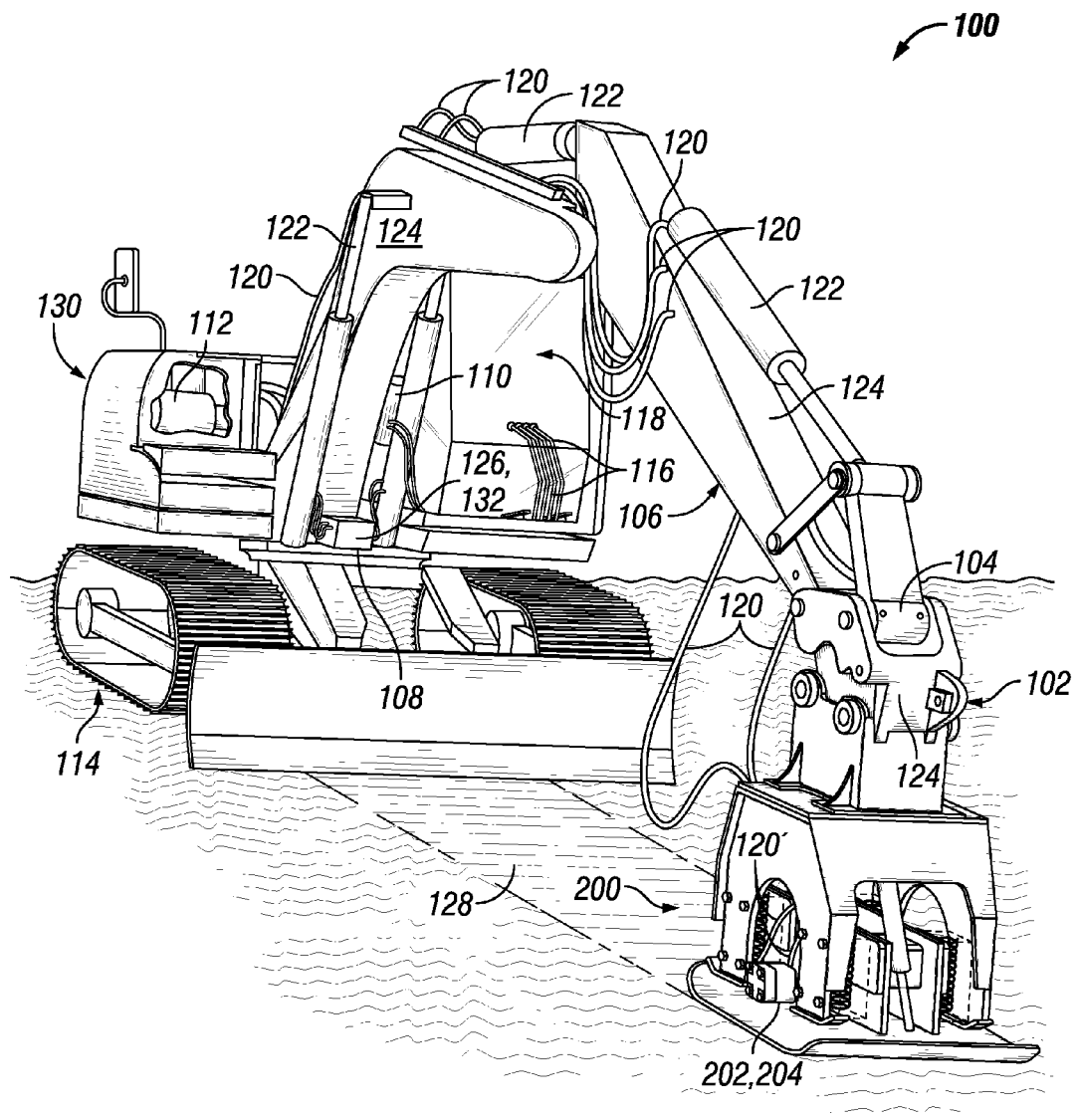
FIG. 1 is a perspective view of a machine using a vibratory plate compactor assembly according to an embodiment of the present disclosure to compact soil.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure provides various embodiments and methods for turning off the vibration mechanism of a vibratory plate compactor assembly if a threshold force is not exerted on the assembly. In some embodiments, the vibration mechanism is shut-off automatically without the need for human intervention. In other embodiments, the vibration mechanism may shut off after a certain period of time has elapsed provided that the threshold force is not reached or exceeded during this time period. In other cases, a signal alerts the operator that the threshold force has not been reached or exceeded who then turns off the vibration mechanism manually. It is further contemplated that the shutting off or starting up of the vibration mechanism may be done in a continuous or incremental manner from zero power to full power in other embodiments.

Looking now at FIG. 1, a perspective view is shown of a machine 100 using a vibratory plate compactor assembly 200 according to an embodiment of the present disclosure to compact soil 128. The machine 100 that is compatible with a vibratory plate compactor assembly 200, that is to say, a coupling device 102 is provided so that the vibratory plate compactor assembly 200 may be attached to the machine and be controlled by the machine 100. In this embodiment, the coupling device 102 is located at the free end 104 of the boom 106 opposite the end 108 of the boom 106 that is attached to the turn table 130 of the machine 100. The machine 100 further comprises a controller 110, a motor 112, a wheel or track undercarriage 114 that is driven by the motor 112, and the vibratory plate compactor assembly 200 that is attached to the boom 106 of the machine 100 using the coupling device 102 as already mentioned. The controller 110 is in communication or operative association with the controls 116 provided in the cab 118 so that the operator may control the movement and function of various parts and systems of the machine 100.

More specifically, the machine 100 depicted in FIG. 1 is a large excavator but it is contemplated that other machines such as backhoes and the like could also use a vibratory plate compactor assembly 200 according to any embodiment of the present disclosure. Furthermore, the machine 100 is mobile on a track driven undercarriage 114 but a more conventional wheel or tire type undercarriage may also be used that is powered by the motor 112. For this machine 100, the motor 112 comprises an internal combustion engine but other motors such as an electric motor could be used for other embodiments. In addition, hydraulic hoses 120 connect the cylinders 122 that move the linkage members 124 of the boom 106 to an hydraulic manifold 126. Similarly, hydraulic hoses 120' connect the vibration mechanism 202 of the vibratory plate compactor assembly 200 to the manifold 126. A hydraulic pump (not shown) provides the hydraulic fluid necessary to rotate or otherwise drive the eccentric mechanism 204 that is part of the vibration mechanism 202. The movement of the boom 106 and powering of the vibration mechanism 202 may be achieved by other devices or methods in other embodiments such as by mechanical or electrical power, etc.

Figure 2:
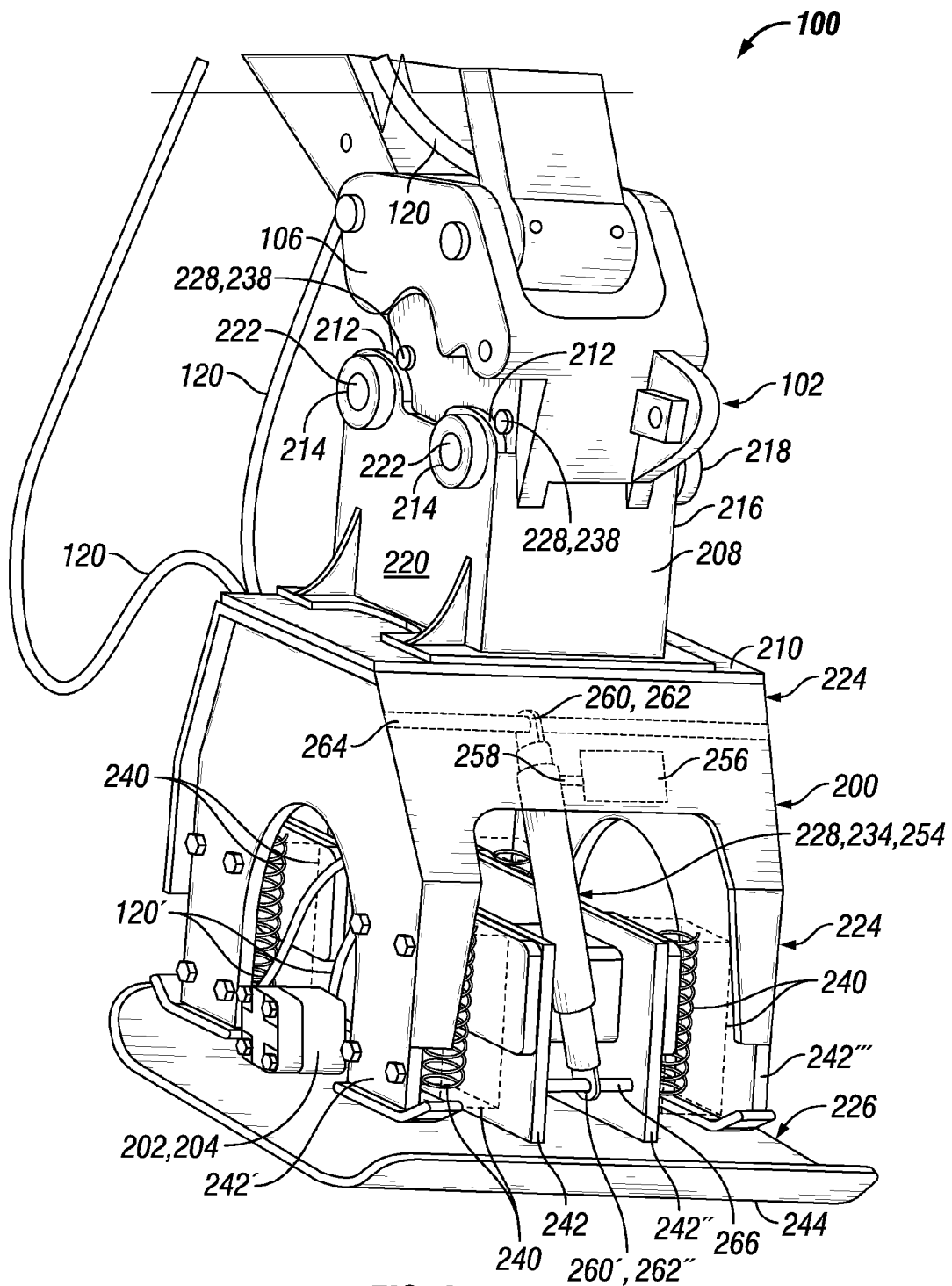
FIG. 2 is an enlarged detail view of the vibratory plate compactor assembly connected to the boom of the machine of FIG. 1.

Turning now to FIG. 2, the coupling device 102 that connects the vibratory plate compactor assembly 200 to the machine 100 can be seen more clearly as well as the hydraulic hoses 120' that connect the vibration mechanism 202 to the hydraulic manifold 206 (shown by hidden lines) of the assembly 200 and system of the machine via hoses 120. The assembly includes an adapter subassembly 208 that is attached to the top plate 210 of the assembly 200 using fasteners, welding, etc. The adapter subassembly 208 includes a first side plate 220 with two ear portions 212 that define pin receiving bores 214 and a second side plate 216 with two ear portions 218 that define pin receiving bores that are aligned concentrically with the pin receiving bores 214 of the first side plate 220. Only one side may be clearly seen as the other side is obstructed by the boom 106 of the machine, but it is to be understood that both sides may be similarly constructed. Pins 222 that are part of the coupling device 102 of the machine extend through the bores 214 to hold the adapter subassembly 208 and vibratory plate compactor assembly 200 to the boom 106 of the machine 100. In some embodiments, the coupling device 102 may be a quick change coupling mechanism but this might not be the case for other embodiments. In some cases, the assembly 200 may be permanently attached to the machine 100.

Still referring to FIG. 2, the vibratory plate compactor assembly 200 comprises an upper portion 224, a lower portion 226 that is movably attached to the upper portion 224 and that includes a compacting plate 244, a vibration mechanism 202 operatively associated with the lower portion 226 for vibrating the lower portion 226, and means 228 for sensing the force exerted on the lower portion 226 of the assembly 200. The controller (such as machine controller 110 shown in FIG. 1) may be in communication or operative association with the vibration mechanism 202 and the force sensing means 228, and the controller 110 may be configured to shut off the vibration mechanism 202 if the predetermined threshold force is not exerted on the lower portion 226 of the assembly 200. That is to say, the threshold force is not reached or exceeded. As mentioned previously, the controller 110 may be situated on the turn table 130 of the machine 100 itself. For example, in FIG. 1, the controller 110 may located between the cab 118 and the base connection 108 of the boom 106 to the turn table 130. A signal may be sent by the force sensing means 228 to the controller 110, which may cause the controller 110 to send a signal to a bypass valve 132 that is part of the manifold 126 or hydraulic system of the overall machine 100. If the threshold force is not reached, the bypass valve 132 would move into or already be positioned in a bypass position where hydraulic fluid is not sent to the vibration mechanism 202 or the pump that supplies the hydraulic fluid may be shut off, etc.

Figure 3:
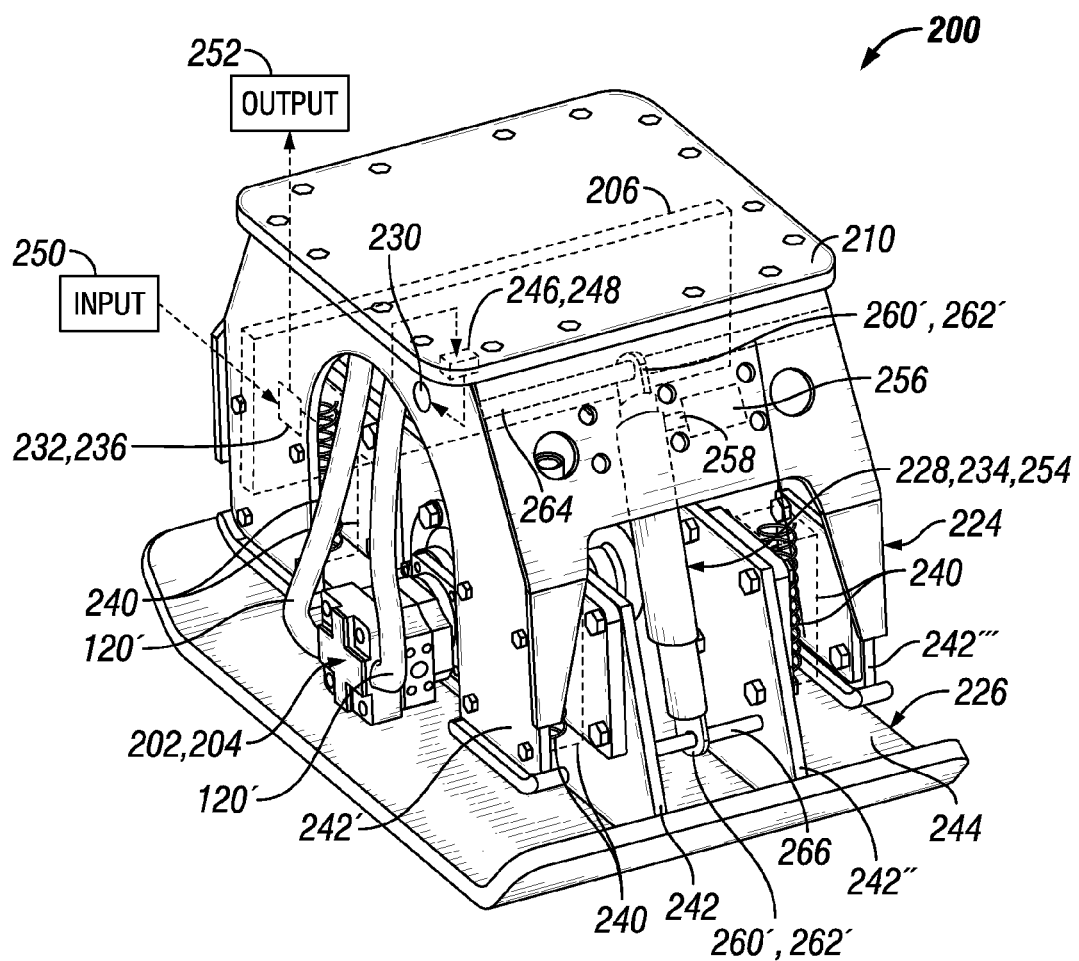
FIG. 3 is a perspective view of the vibratory plate compactor assembly of FIG. 1 shown in isolation from the machine, showing schematically how the assembly is in communication or operative association with a hydraulic manifold and a controller.

In other embodiments as shown in FIGS. 2 and 3, the controller 232 and a hydraulic manifold 206 may be situated on the vibratory plate compactor assembly 200 itself. For example, the hydraulic manifold may be attached to the assembly on the back side of the assembly. Thus the manifold 206 is illustrated in FIGS. 2 and 3 by the hidden lines. The controller 232 in this embodiment may comprise an electrical or mechanical device that moves a bypass valve 230 in the assembly hydraulic manifold 206 into a suitable position if a signal is sent or otherwise conveyed by the force sensing means 228. For example, the force sensing means 228 may include a position sensor 234 that may send a signal to the controller 232, which would then move the bypass valve 230 into a position where the hydraulic fluid is conveyed to the vibration mechanism 202. In some cases, the controller 232 could be a mechanical switch or member 236 that moves the bypass valve 230 into the proper position, etc.

Any of the embodiments of a controller as described herein, such as those just described in the preceding paragraph, may be configured to shut off the vibration mechanism automatically if the force sensing means does not send a signal indicating to the controller that the predetermined force has been reached. In addition, the vibration mechanism may fail to start vibrating if such a signal is not received.

Figure 6:
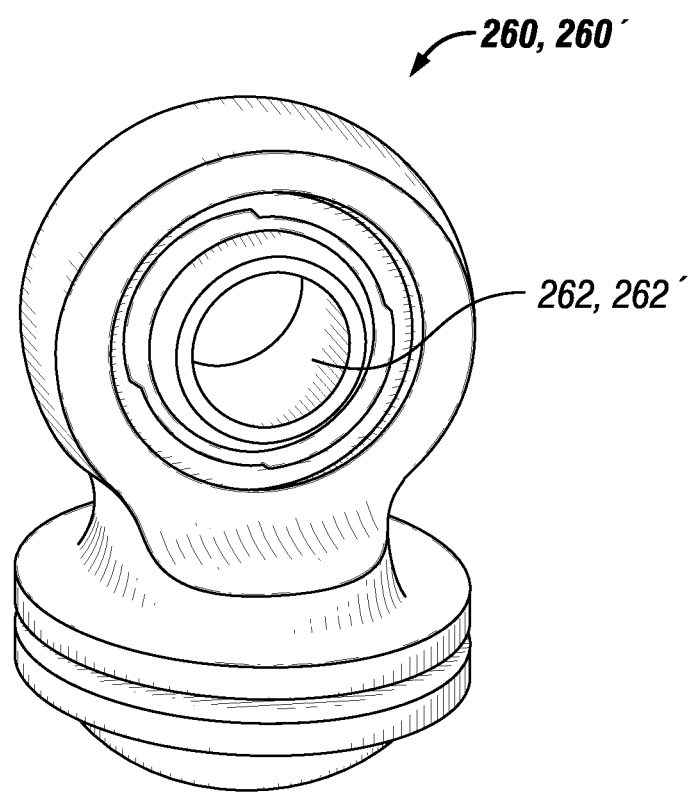
FIG. 6 is a perspective view of a ball joint that may be used as part of the yoke connection between a rod of the compactor assembly and a yoke connection of a position sensor shown in isolation from the assembly or position sensor.

Looking more closely at the position sensor 234 in FIGS. 2 and 3, it can be seen that the position sensor 234 may take the form of a hydraulic cylinder 254 that is attached to an accumulator 256 via a conduit 258. Although not clearly shown, it is to be understood that the accumulator 256 and position sensor 234 are in communication with the hydraulic manifold and a spool valve therein that may control the flow of fluid to the position sensor 234, the accumulator 256, and the vibration mechanism 202. The accumulator is shown to be separate from the hydraulic cylinder but could be part of the cylinder in other embodiments. The operation of the hydraulic circuit will be explained later herein with respect to FIG. 7. The position sensor 234 includes yoke connections 260 that may include a ball joint 262 such as that shown in FIG. 6. Upper and lower rods 264, 266 that are attached to the upper and lower portions 224, 226 of the compactor assembly 200 are shown to be received in the yoke connections 260 of the position sensor 234. As a result, as the lower portion 226 deflects upward and downward depending on the force exerted on the compactor plate 244 (shown in FIGS. 4 and 5), the cylinder 254 will expand or contract, relaying a hydraulic signal to the hydraulic control circuit, which will control the spinning rate of the vibration mechanism 202. The ball joint 262 allows movement in two to three dimensions as the upper and lower portions 224, 226 of the compactor assembly 200 move relative to each other.

As also best seen in FIG. 2, the means 228 for sensing the force exerted on the lower portion 226 of the vibratory plate compactor assembly 200 may include the use of a load cell(s) 238 that is (are) part of the coupling device 102 and that may form part of the interface between the vibratory plate compactor assembly 200 and boom 106 of the machine 100. In other embodiments as shown in both FIGS. 2 and 3, the means 228 for sensing the force exerted on the lower portion 226 of the vibratory plate compactor assembly 200 may include a position sensor 234 as will be described in detail later herein. In some cases, the position sensor 234 comprises a linear variable differential transformer or a hydraulic cylinder that uses pressure, acceleration, and/or a position tripping mechanism to measure the force. This position sensor 234 may be in contact with the upper portion 224 and the lower portion 226 of the vibratory plate compactor assembly 200. A plurality of isolation members 240 that connect the upper portion 224 to the lower portion 226 in a resilient manner may also be provided. These isolation members 240 may be positioned between the vertical members 242 of the upper and lower portions of the vibratory plate compactor assembly 200 and may be connected to these members 242 using fasteners or the like.

In other embodiments, it is contemplated that the force may be determined using acceleration sensors that give the value of the acceleration of the lower portion of the vibratory plate compactor assembly to a controller that uses the mass of the lower portion of the assembly and this acceleration to calculate the force.

As alluded to earlier, the vibration mechanism 202 may comprise an eccentric mechanism 204 that is configured to be hydraulically rotated. As the eccentric rotates, downward and upward force is conveyed to the lower portion 226 of the vibratory plate compactor assembly 200, causing the compacting plate 244 to move up and down. The assembly 200 may comprise a hydraulic manifold 206 with a valve 230 and valve opening and closing means 246 such as a solenoid, wherein the controller 232 is in communication or operative association with the valve 230 and the hydraulic manifold 206 is in fluid communication with the eccentric mechanism 204 via the valve 230, whereby the valve 230 is opened or closed by the controller 232 to turn the eccentric mechanism 204 on or off via the valve opening or closing means 246.

Figures 4, 5:
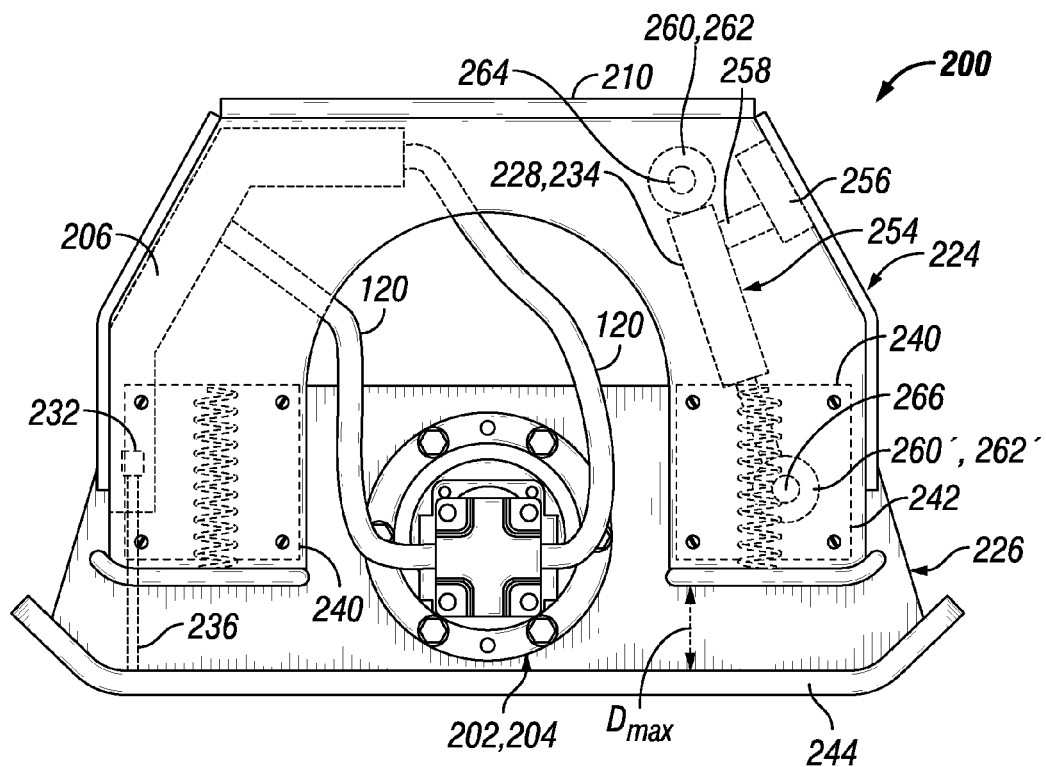
FIG. 4 is a side view of the vibratory plate compactor assembly of FIG. 3 showing the compactor plate in an extended state where the desired threshold force has not yet been applied to the assembly. Or a threshold position has not been reached
FIG. 5 is a side view of the vibratory plate compactor assembly of FIG. 4 showing the compactor plate in a retracted state where the desired threshold force has been applied to the assembly. Or a threshold position has been reached

Focusing now on FIGS. 3 thru 5, an embodiment of a vibratory plate compactor assembly 200 according to an embodiment of the present disclosure may be seen in isolation from the machine as a whole. The vibratory plate compactor assembly 200 may comprise an upper portion 224, a lower portion 226 that is movably attached to the upper portion 224 and that includes a compacting or vibrating plate 244, a vibration mechanism 202 operatively associated with the lower portion 226 for vibrating the lower portion 226, and a position sensor 234 disposed between the upper portion 224 and the lower portion 226 that is configured to sense if a predetermined force is exerted on the lower portion 224.

In FIG. 3, the isolation members 240 that connect the upper portion 224 to the lower portion 226 are shown schematically as springs but it is to be understood that they are usually made of solid rubber (denoted by dotted lines). In some embodiments, the rubber is natural, or synthetic, or some combination of both. In other embodiments, a polyurethane may be used, etc.

Figure 8:
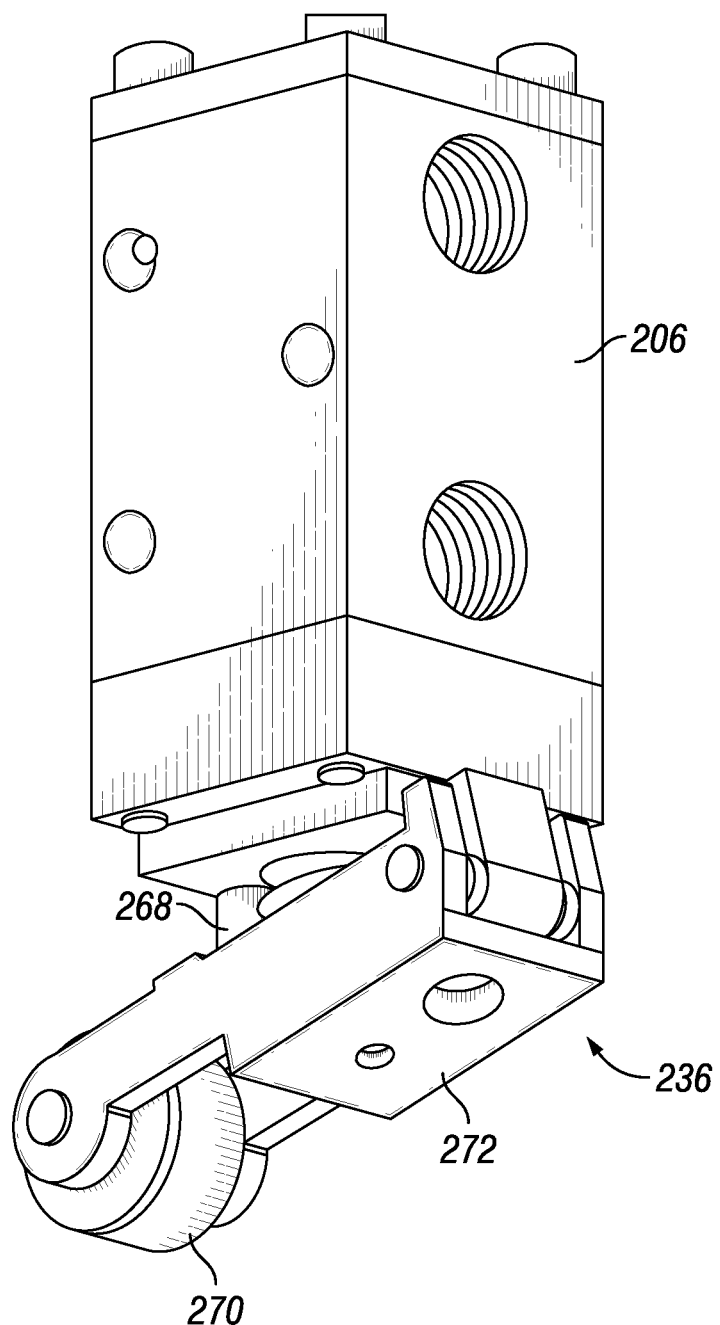
FIG. 8 is a perspective view of a purely mechanical switch connected to a hydraulic manifold for use with a compactor assembly that may prohibit the vibration mechanism from vibrating if a threshold deflection of the compactor plate is not sensed by the position sensor.

As best seen in FIG. 3, a controller 232 that is in communication or operative association with the position sensor 234 and the vibration mechanism 202 may be provided. The controller 232 may be configured to shut off the vibration mechanism 202 automatically if the position/pressure sensor 234 does not send a signal indicating to the controller 232 that the predetermined position/force has been reached. A member 236 of the controller 232 may be in contact with the compacting plate 244 that presses onto an actuator 248 that controls a bypass valve 230 that alters the flow of hydraulic fluid to turn the vibration mechanism 202 on or off. This member 236 may be characterized as a purely mechanical position sensor. FIG. 8 illustrates more clearly such a purely mechanical position sensor 236 that is in operative association with a spool valve 268 and the manifold 206. A rotating wheel 270 may be configured to contact the compacting plate 244. As the plate 244 pushes up on the wheel due to deflection, the lever 272 will also push up onto a spool valve 268 that will allow fluid to power the vibration mechanism 202. On the other hand, if a suitable amount of deflection is not supplied by the compactor plate 244, then the lever 272 is biased downwards, causing the spool valve 268 to move downwards as well, cutting off the flow to the vibration mechanism 202. Though not shown, hard stops may be provided to protect the position sensor, spool valve and manifold 206 if too much deflection or force is exerted on the compactor plate 244.

In other embodiments, the controller 232 could be an electronic controller that is in wired or wireless communication with the main controller 110 of the machine 100 or the bypass valve 230 may located within the vibratory plate compactor assembly 200 and the valve opening or closing means 246 may be in wireless or wired communication with the main controller 110 of the machine, etc. Accordingly, it is contemplated that the signal may be in any suitable form including electrical, mechanical, hydraulic, etc.

Any of the controllers 110, 232 may be provided with input means 250, such as a GUI (graphical user interface) or HMI (human machine interface) for the input of variables and output means 252, such as a computer screen, speakers, lights, etc. for producing an output of signals including visual and/or auditory cues that alert the operator if the vibration mechanism and/or isolation members is(are) in danger of being damaged due to an insufficient force being exerted on the vibratory plate compactor assembly 200. The operator may then turn off the vibration mechanism if desired.

As best seen in FIGS. 4 and 5, the vibratory plate compactor assembly 200 is configured in some embodiments to provide a maximum load and the minimum predetermined threshold force is at least 40% of the maximum load. In some cases, the maximum amount of deflection Dmax may be calculated and the minimum predetermined threshold deflection Dmin, which is proportional to the threshold force by the amount of a spring constant of all the isolation members 240 combined, may be expressed as a percentage of the maximum deflection. This threshold deflection may be 50-65% of the maximum deflection.

The position sensor may also comprise a linear variable differential transformer that is connected to the upper portion and the lower portion. However, this necessitates an electrical controller that may increase the complexity of the system. On the other hand, the position sensor may comprise a hydraulic cylinder that extends between the upper and lower portion of the assembly as previously described. The hydraulic cylinder may use pressure, acceleration, a proximity switch, or any suitable combination thereof to send a signal or operatively move a bypass valve so that the vibration mechanism is turned on or off as appropriate. For example, a hydraulic cylinder sold under the tradename of INTELLINDER Absolute Position Sensor may be used sold by Parker-Hannifin.

Figure 7:
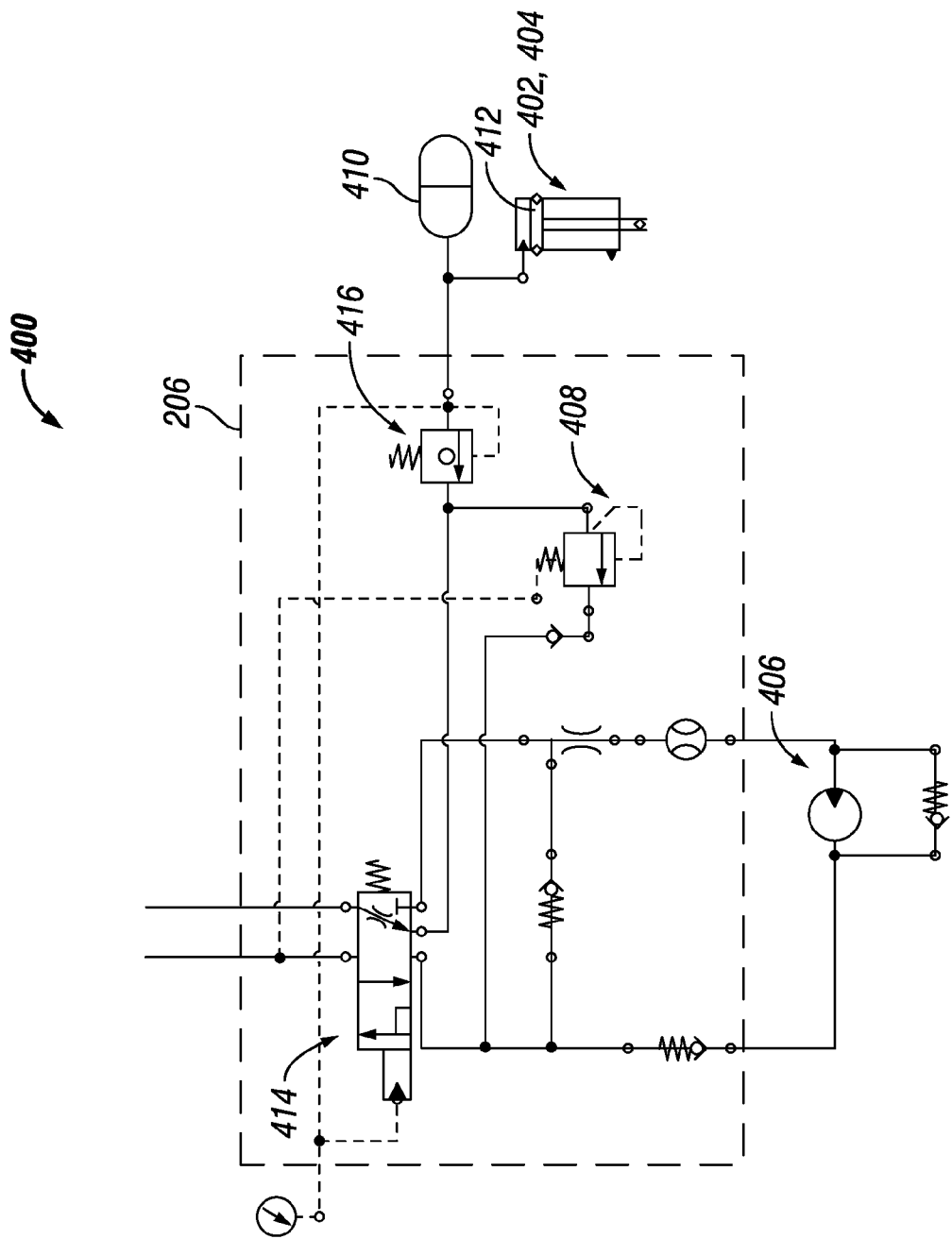
FIG. 7 is a schematic of a hydraulic circuit that may be used with a position sensor for turning off the vibration mechanism if a threshold deflection of the compactor plate is not sensed by the position sensor.

As shown in FIG. 7, a hydraulic control circuit 400 may be used in conjunction with a hydraulic cylinder 402/position sensor 404 to turn the vibrating mechanism/motor 406 on and off depending on the position of the compactor plate 244 as previously mentioned. A sequence valve 408 may allow the cylinder 402/accumulator 410 to be precharged with enough fluid to operate. Once enough fluid is in the cylinder 402/accumulator 410, the position of the piston 412 in the cylinder 402 will send a hydraulic signal to the spool valve/control mechanism 414, moving the spool valve/control mechanism 414 as the pressure in the cylinder 402 increases as the compactor plate 244 moves upward. Once enough pressure is exerted on the spool valve 414, fluid will be sent to the motor/vibration mechanism 406, powering the mechanism, creating vibrations. If not enough pressure is exerted or sensed by the spool valve control mechanism 414, then the fluid is not sent to the motor but is sent back to the return tank. On the other hand, if too much force or pressure is created in the cylinder 402, then the pressure relief valve 416 is activated and fluid is also diverted from the motor/vibration mechanism 406 and sent to the return tank, avoiding damage to the compactor assembly 200.

The vibration mechanism 200 illustrated in FIGS. 3-5 comprises an eccentric mechanism 204 that is configured to be hydraulically rotated. However, other vibration mechanisms could be employed such as reciprocating pistons or masses that are mechanically, hydraulically, or magnetically driven. Also, one or more eccentrically shaped shafts may be rotated. It is further contemplated that an imbalanced mass stator may be rotated about a shaft using magnetic forces, etc.

INDUSTRIAL APPLICABILITY

In practice, a vibratory plate compactor assembly as discussed herein may be manufactured, sold or attached to a machine as described herein. This may be done in an aftermarket or OEM context, that is to say, the vibratory plate compactor assembly may be sold originally with a machine or be attached to the machine later after the original purchase of the machine. Similarly, a machine may originally be equipped or configured to use any of the embodiments of a vibratory plate compactor assembly as described herein or be retrofitted with the ability to use such assemblies. For example, when electronic controllers or the like are used that implement a processing device that is configured to execute instructions for implementing a method according to an embodiment described herein, it is contemplated that the instructions may be downloaded to the controller as needed or desired.

Figure 9:
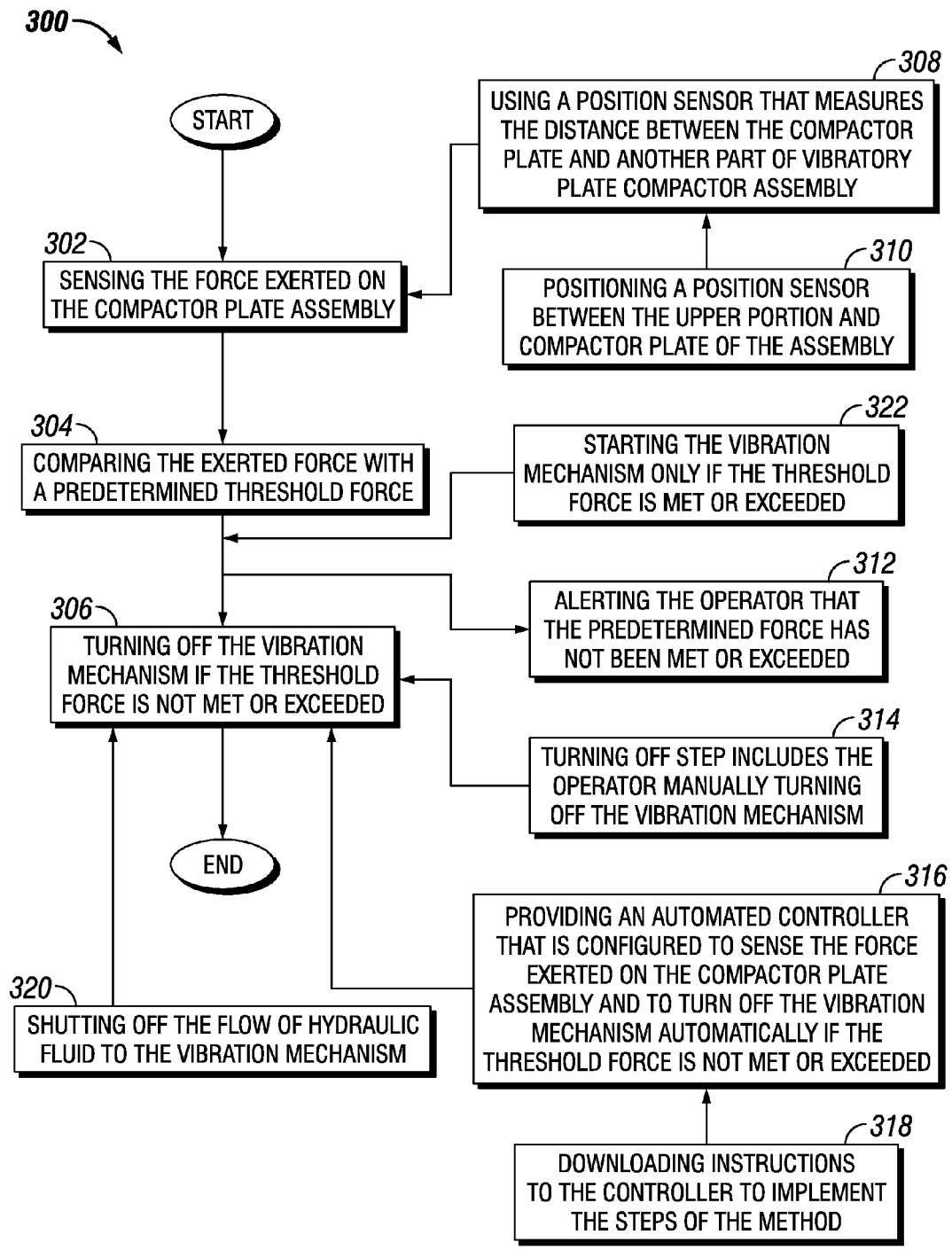
FIG. 9 is a flow chart illustrating a method for turning off the vibration mechanism of a vibratory plate compactor assembly when the desired threshold force has not been applied to the assembly.

FIG. 9 is a flowchart that describes a method 300 for preventing damage to a vibratory plate compactor assembly that occurs when it vibrates without being loaded. The method 300 may shut off the vibration mechanism of a vibratory plate compactor assembly that is configured to be attached to a machine when desired. The method comprises sensing the force exerted on the compactor plate assembly (see step 302), comparing the exerted force with a predetermined threshold force (see step 304), and turning off the vibration mechanism if the threshold force is not met or exceeded (step 306).

In some embodiments, the sensing step (302) may comprise using a position sensor that measures the distance between the compactor plate and another part of vibratory plate compactor assembly (308). This step may itself comprise positioning a position sensor between the upper portion and compactor plate of the assembly (310).

In other embodiments, the method may further comprise alerting the operator that the predetermined force has not been met or exceeded (312) and the turning off step includes the operator manually turning off the vibration mechanism (314).

Conversely, the method may further comprise providing an automated controller that is configured to sense the force exerted on the compactor plate assembly and to turn off the vibration mechanism automatically if the threshold force is not met or exceeded (316). In such an embodiment, the method may further comprise downloading instructions to the controller to implement the steps of the method (318).

In some embodiments, the vibration mechanism is hydraulically driven and the turning off step includes shutting off the flow of hydraulic fluid to the vibration mechanism (320).

In most embodiments, the method may include the step of starting the vibration mechanism only if the threshold force is met or exceeded (322). This may help prevent unwanted damage to the vibratory plate compactor assembly before any compacting of any work surface has even been started.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the disclosure(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A vibratory plate compactor assembly comprising:
   an upper portion;
   a lower portion that is movably attached to the upper portion and that includes a compacting plate;
   a vibration mechanism operatively associated with the lower portion for vibrating the lower portion;
   a position sensor disposed between the upper portion and the lower portion that is configured to sense if a predetermined distance between the lower portion and the upper portion has been exceeded; and
   a controller that is in communication or operative association with the position sensor and the vibration mechanism, wherein the controller is configured to shut off the vibration mechanism automatically if the position sensor does not send a signal indicating to the controller that the predetermined distance has been reached.

2. The assembly of claim 1 wherein the controller is configured to prevent the vibration mechanism from starting automatically if the position sensor does not send a signal indicating to the controller that the predetermined distance has been reached.

3. The assembly of claim 1 wherein the position sensor comprises a hydraulic cylinder that is connected to the upper portion and the lower portion.

4. The assembly of claim 1 further comprising a plurality of isolation members that connect the upper portion to the lower portion.

5. The assembly of claim 1 wherein the vibration mechanism comprises an eccentric mechanism that is configured to be hydraulically rotated.

6. A machine that is compatible with a vibratory plate compactor assembly, the machine comprising:
   a controller;
   a motor;
   an undercarriage that is driven by the motor; and
   a vibratory plate compactor assembly including:
      an upper portion;
      a lower portion that is movably attached to the upper portion and that includes a compacting plate;
      a vibration mechanism operatively associated with the lower portion for vibrating the lower portion; and
      means for sensing the force exerted on the lower portion of the assembly;
   wherein the controller is in communication or operative association with the vibration mechanism and the force sensing means, the controller being configured to shut off the vibration mechanism if the predetermined force is not exerted on the lower portion of the assembly.

7. The machine of claim 6 wherein the controller is configured to shut off the vibration mechanism automatically if the position sensor does not send a signal indicating to the controller that the predetermined force has been reached.

8. The machine of claim 6 wherein the means for sensing the force exerted on the lower portion of the vibratory plate compactor assembly includes a position sensor comprising a linear variable differential transformer or a hydraulic cylinder that is connected to the upper portion and the lower portion.

9. The machine of claim 6 further comprising a plurality of isolation members that connect the upper portion to the lower portion.

10. The machine of claim 6 wherein the vibration mechanism comprises an eccentric mechanism that is configured to be hydraulically rotated.

11. The machine of claim 10 further comprising a hydraulic manifold with a valve and valve opening and closing means, wherein the controller is in communication or operative association with the valve and the hydraulic manifold is in fluid communication with the eccentric mechanism via the valve, whereby the valve is opened or closed by the controller to turn the eccentric mechanism on or off.

12. The machine of claim 6 wherein the vibratory plate compactor assembly is configured to provide a maximum deflection and the minimum predetermined deflection is at least 50-65% of the maximum deflection.

13. A method for shutting off the vibration mechanism of a vibratory plate compactor assembly, the method comprising:
   sensing the position of exerted on the vibratory plate compactor assembly;
   comparing the position with a predetermined threshold force; and
   turning off the vibration mechanism if the threshold position is not met or exceeded.

14. The method of claim 13 wherein the sensing step comprises using a position sensor that measures the distance between the compactor plate and another part of vibratory plate compactor assembly.

15. The method of claim 14 further comprising connecting a position sensor between the upper portion and compactor plate of the assembly.

16. The method of claim 13 further comprising alerting the operator that the predetermined position has not been met or exceeded and the turning off step includes the operator manually turning off the vibration mechanism.

17. The method of claim 13 further comprising providing an automated controller that is configured to sense the force exerted on the compactor plate assembly and to turn off the vibration mechanism automatically if a threshold force is not met or exceeded.

18. The method of claim 17 further comprising downloading instructions to the controller to implement the steps of the method.

19. The method of claim 13 wherein the turning off step includes shutting off the flow of hydraulic fluid to the vibration mechanism.

20. The method of claim 13 further comprising starting the vibration mechanism if the threshold position is met or exceeded.

* * * * *